May 12, 1953  S. T. CARTER  2,638,202
ARTICLE ESCAPEMENT MECHANISM FOR CONVEYERS
Filed June 28, 1950  3 Sheets-Sheet 1
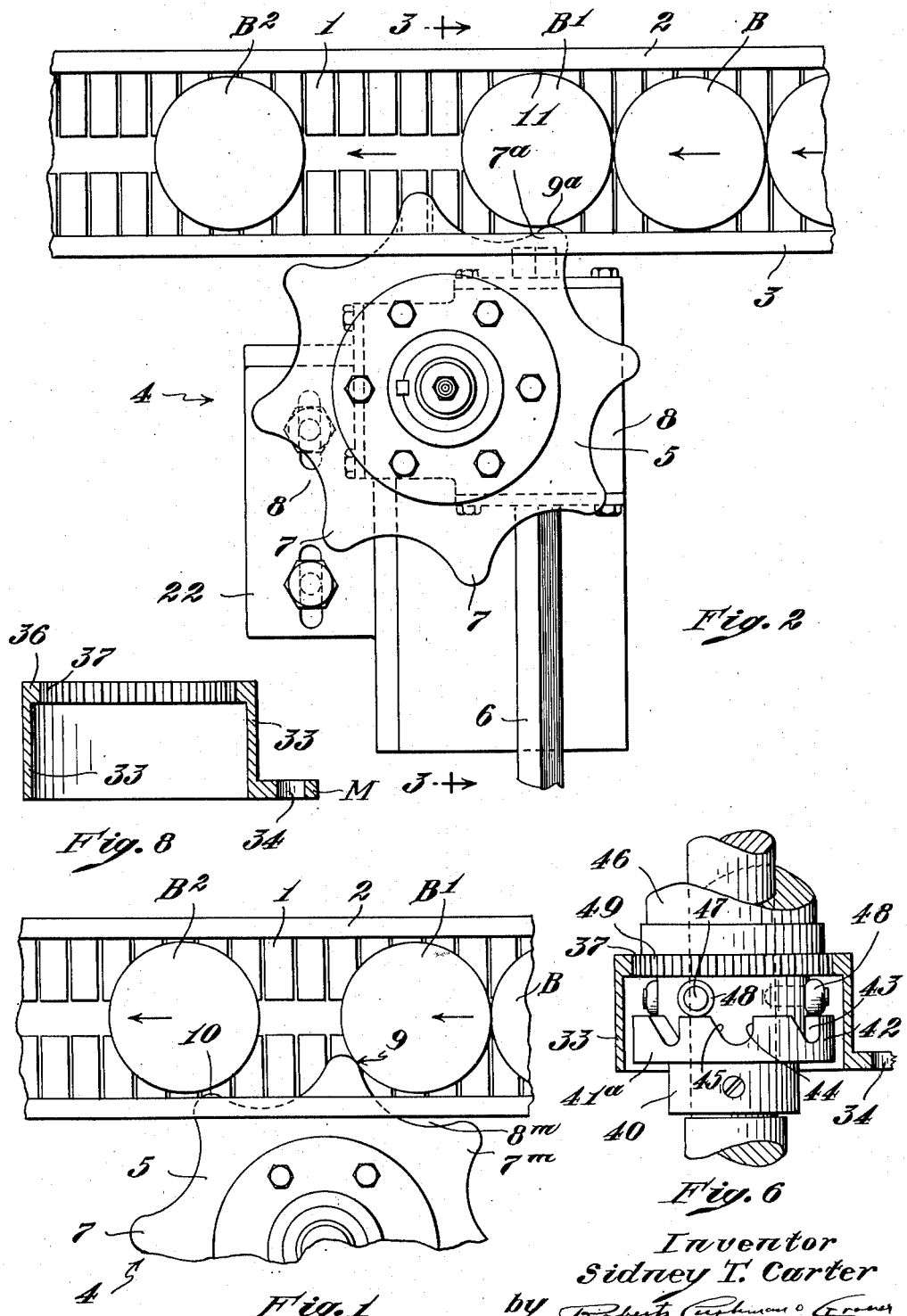
Inventor
Sidney T. Carter May 12, 1953   S. T. CARTER   2,638,202
ARTICLE ESCAPEMENT MECHANISM FOR CONVEYERS
Filed June 28, 1950   3 Sheets-Sheet 2
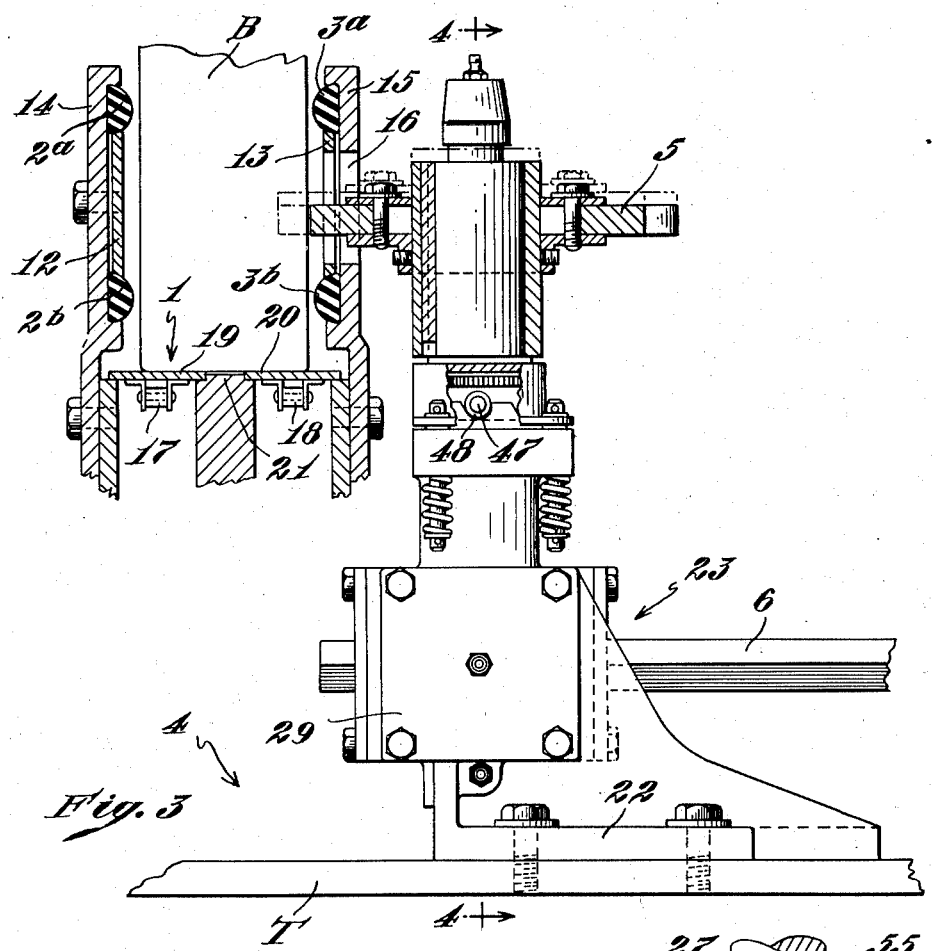
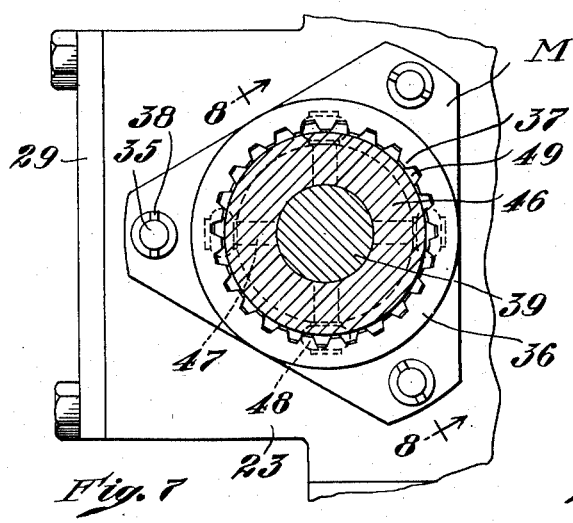
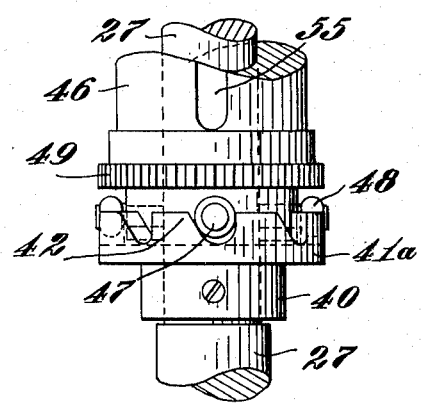
Fig. 3
Fig. 7
Fig. 5
Inventor
Sidney T. Carter
by Roberts Cushman & Grover
attys Patented May 12, 1953

2,638,202

UNITED STATES PATENT OFFICE 2,638,202

ARTICLE ESCAPEMENT MECHANISM FOR CONVEYERS

Sidney T. Carter, Worcester, Mass., assignor, by mesne assignments, to Geo. J. Meyer Manufacturing Co., Cudahy, Wis., a corporation of Wisconsin Application June 28, 1950, Serial No. 170,762

15 Claims. (Cl. 198—34)

This invention pertains to article escapement mechanism for conveyors; more especially to that type of escapement wherein a rotatable star wheel turns in time relation to power driven apparatus to which articles are delivered by the conveyor. By way of example, but without limitation, the apparatus to which the articles are delivered may be a labeling machine. When the conveyor is designed to advance the articles along a horizontal path, the star wheel turns about a vertical axis adjacent to said path, the parts being so arranged that in normal operation each article, as it is advanced by the conveyor, will be received in the recess between adjacent teeth of the star wheel. The star wheel will then permit the advance of the article, thus held between its adjacent teeth, and the next article advanced by the conveyor will enter the next recess of the star wheel, etc., successive articles being delivered from the power-driven star wheel in definitely spaced relation and at a definite linear velocity. In approaching the star wheel the articles are confined between parallel guide rails which are continued on past the star wheel so as to hold the articles within the wheel recesses. If the articles being advanced by the conveyor are all of exactly the same size and shape and if they approach the star wheel at the proper speed the star wheel will continue to function in the intended manner. On the other hand, if an article which is irregular in shape or size is delivered by the conveyor to the star wheel the article may not enter properly into the recess between adjacent teeth of the wheel but may be engaged by a tooth of the wheel in such a way that the tooth presses the article against the opposite guide wall with the line of pressure between the points of contact at an angle such that the article becomes jammed. The pressure of on-coming articles may then be sufficient to break the article which has become jammed or to break a part of the star wheel mechanism. Various devices have heretofore been designed, including escape gates, etc., to avoid such occurrences. Some of these prior devices are not wholly reliable; in other cases they are complicated and expensive to make; and some devices of this kind necessitate substantial change in the conveyor or in the apparatus to which the articles are to be delivered.

One object of the present invention is to provide an escapement mechanism of the star wheel type so designed as automatically to free an article which is jammed between an advancing tooth of the star wheel and the opposite guide rail of the conveyor. A further object is to provide an escapement mechanism which automatically frees articles jammed between the star wheel and the opposite guide rail and which then allows the freed article to advance in properly timed relation to the mechanism to which the articles are being delivered by the conveyor. A further object is to provide escapement mechanism operative to free a jammed article from the pressure of the star wheel tooth and for locking the star wheel against rotation in either direction during the clearing of the jammed article. A further object is to provide escapement mechanism wherein a jammed article is subjected to vibration in a direction substantially perpendicular to the conveyor path thereby to shake it loose from its pressure contact with the star wheel and guide rail. A further object is to provide an escapement mechanism which is readily applicable to conveyors of conventional type without requiring substantial modification of the conveyor. A further object is to provide escapement mechanism operative automatically to clear a jammed article, although the guide rails at opposite sides of the conveyor path are normally fixed and unprovided with lateral escape ports or gates. Other and further objects and advantages of the invention will be pointed out in the following more detailed description and by reference to the accompanying drawings wherein Fig. 1 is a fragmentary, diagrammatic, plan view illustrating a conveyor with an associated star wheel type of escapement and showing the articles moving along and being separated in normal manner by the star wheel;

Fig. 2 is a view generally similar to Fig. 1 but showing one of the advancing articles jammed between a tooth of the star wheel and the guide rail at the opposite side of the conveyor;

Fig. 3 is a fragmentary, vertical section substantially on the line 3—3 of Fig. 2;

Fig. 5 is a fragmentary, side elevation showing the cam device whereby vertical vibrational movement is imparted to the star wheel thereby to free a jammed article;

Fig. 6 is a view similar to Fig. 5, but showing the roller detent members resting upon the upper faces of the cam teeth;

Fig. 7 is a fragmentary, horizontal section on the line 7—7 of Fig. 4, but to larger scale; and Fig. 8 is a diametrical section, to larger scale than Fig. 7, illustrating a fixed abutment device operative at times to prevent rotation of the star wheel.

Figure 4:
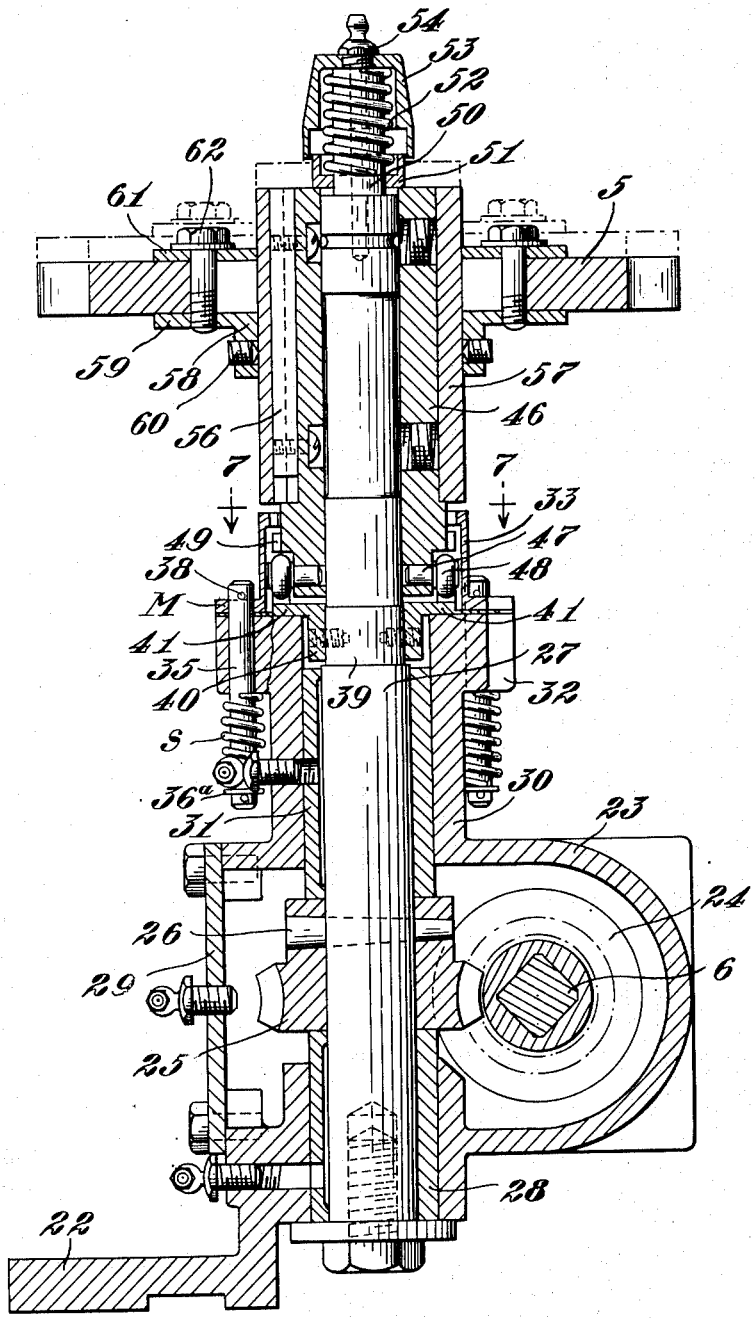
Fig. 4 is a vertical section, to larger scale, on the line 4—4 of Fig. 3, showing details of the improved escapement means of the present invention.

Referring to the drawings, and particularly to Figs. 1 and 2, the numeral 1 indicates a conveyor which may be of any conventional type, for example a so-called "plate conveyor" in which independent rigid plates are supported by an endless chain or chains, the series of plates at the upper run of the chain constituting the support upon which the articles rest and by which they are advanced along the conveyor path. As illustrated, guide rails 2 and 3 are arranged at opposite sides of the conveyor path, the rails being spaced apart a distance approximating the diameter or transverse thickness of the articles $B$, $B^1$, $B^2$, $B^3$, etc. which are to be conveyed. It is to be understood that the conveyor is designed to deliver articles to a machine or other mechanism which, for its proper functioning, should receive successive articles in definitely spaced relation. The numeral 4 (Figs. 1 and 2) designates, in general, the escapement mechanism of the present invention which is designed to engage and to deliver the successive articles one by one in properly spaced relation. As illustrated, this improved escapement mechanism is of the star wheel type comprising the star wheel 5 here shown as having eight teeth 7 with intervening recesses or notches 8, the star wheel turning about a vertical axis so located relatively to the guide rail 3 of the conveyor that, as the star wheel turns, successive teeth enter through a suitable slot in the guide rail 3 and extend part way across the conveyor path. The star wheel 5 will normally be driven in exact timed relation to the mechanism to which the articles are to be driven, the star wheel drive shaft 6 being suitably connected by gearing or other motion-transmitting means (not shown) to the mechanism to which the articles are to be delivered.

Normally the articles approach the escapement mechanism while moving along the conveyor path so that successive articles $B$, $B^1$ are in contact with each other, the articles being confined between the guide rails 2 and 3 so that they can not move transversely of the path. For specific example, the articles here illustrated are circular, for instance bottles or cans. In the normal operation (Fig. 1) the leading article $B^1$ of the series will enter the recess $8^m$, for example, between successive teeth of the star wheel and will first contact a tooth of the star wheel at the point 9, as shown in Fig. 1. As the star wheel rotates, the recess $8^m$ receives the peripheral portion of the article adjacent to the guide rail 3 and permits the article to continue along the conveyor path, the following tooth $7^m$ of the star wheel eventually engaging the peripheral surface of the article. The tooth which thus contacts the articles disengages the article just before the tooth tip reaches the point 10 (Fig. 1), the article then being at the position $B^2$. This operation is repeated as the star wheel rotates and since the conveyor 1 travels slightly faster than the star wheel, the articles can only move past it as fast as the star wheel permits them to do, the result is that successive articles, as delivered from the star wheel, will be spaced apart equal distances and will thus be properly delivered to the mechanism which is to receive them.

While this is the normal operation, it may occur, due for example, to irregularity in shape of one of the articles or for other reason, that the article will not properly enter the recess of the star wheel which should receive it, so that a tooth of the star wheel, for example the tooth $7^a$ (Fig. 2) will contact the periphery of the article $B^1$ at a point such as the point $9^a$ at which the line of pressure extending from the point $9^a$ to the point 11, where the article contacts the guide rail 2, is so nearly perpendicular to the guide rail 2 that the article will not slide in contact with said rail and thus will become jammed, stopping the further advance of articles along the conveyor path. This stoppage will continue unless the article or some part of the mechanism yields by breakage or deformation.

The present invention provides means whereby such a jamming of the article, if it does occur, is automatically remedied and in such a manner that the article which was jammed, after being freed, will be delivered in properly timed relation to the mechanism to which the articles are being fed.

Referring to Fig. 3, each of the guide rails of the conveyor is shown as comprising a pair of vertically spaced members $2^a$, $2^b$ and $3^a$, $3^b$ respectively, which are clamped in properly spaced relation by means of clamping members 12 and 13 respectively, to fixed supporting brackets 14 and 15. The bracket 15 is provided with a horizontal slot 16 for the passage of the teeth of the star wheel 5—the clamping member 13 being provided with a corresponding registering slot. As shown, the conveyor 1 comprises a pair of parallel endless chains 17 and 18 each supporting a series of independent, rigid, smooth surfaced plates 19 and 20 upon which the articles B rest and by which they are moved along between the guide rails. A fixed guide 21 is arranged between the adjacent edges of the series of plates 19 and 20.

In Fig. 3, the letter T represents a table or support which may form a part of the mechanism to which the articles are being delivered. On this table is mounted the base 22 (Figs. 3 and 4) of a casing 23, which may be a casting, which is provided with bearings for the inner end of the square drive shaft 6 which turns in accurately timed relation to the mechanism to which the articles are being fed. Slidably mounted on this shaft, within the casing 23 (Fig. 4) is a worm 24 which meshes with a worm wheel 25 which is pinned at 26 to the vertical shaft 27 which carries the star wheel 5. This arrangement of parts permits adjustment of casing 23 and the star wheel toward and away from conveyor 1. At its lower end the shaft 27 is arranged to turn on an adjustable step bearing and within a bearing bushing 28 arranged within the housing 23. A removable cover plate 29 at one side of the housing 23 provides for access to the gearing, the space within the housing being desirably filled with lubricant. The casing 23 has a tubular extension 30 (Fig. 4) coaxial with the shaft 27 and within this tubular extension 30 is arranged another bushing 31 providing a second bearing for the shaft 27. At its upper end the member 30 is provided with a heavy horizontal flange 32 having a substantially flat upper surface. On this upper surface rests the annular base M of a normally stationary abutment device (Figs. 4 and 8) comprising the vertical sleeve portion 33 which is of an internal diameter substantially greater than that of the shaft 27. At its upper end the sleeve portion 33 is provided with an inwardly directed radial flange 36 (Fig. 8) whose inner edge is shaped to form a series of spur teeth 37. The base M is provided with a plurality of vertical openings 34 (Fig. 8) which receive rods 35 (Fig. 4) arranged to slide in corresponding openings in the flange 32. Each rod is provided at its lower end with a collar 36ª on which rests the lower end of a compression spring S, the upper end of which bears against the underside of the flange 32. Each rod 35 is also provided with a transverse pin 38 at a point above the base M of the abutment device. The opposite ends of the pins 38 rest upon the upper surface of the base M. This arrangement permits the abutment device, comprising the sleeve 33, to rise from the upper surface of the flange 32, although the springs S normally hold it down against the flange 32. However the rods 35 prevent the sleeve 33 from rotating about the axis of the shaft 27.

Just above the upper end of the bearing bushing 31, the shaft 27 is reduced in diameter as shown at 39 and this reduced portion of the shaft receives a sleeve 40 which is fixed to the shaft by set screws or the like and which has a horizontal radial flange 41 (Fig. 4) at its upper end. This flange 41 is of a diameter such that it may be housed within the lower part of the sleeve 33 of the abutment device and is provided at its outer margin with an upstanding sleeve-like portion 41ª (Figs. 5 and 6) whose upper edge is shaped to provide a series of teeth 42 separated by recesses 43, each tooth having a substantially vertical side wall 44 (Fig. 6) and an inclined side wall 45, the upper edges of the teeth being flat and horizontal.

Above the part 40 which, with its toothed portion 41ª, is hereinafter referred to as the "cam device" or "toothed ratchet," there is provided a sleeve 46 (Figs. 4, 5 and 6) which receives the upper portion of the shaft 27. Near its lower end this sleeve 46 is provided with a plurality of radial studs 47 fixed in the substance of the sleeve in any desired way, each of these studs carrying a freely rotatable cam follower roll or roller detent 48. The number of these rollers and the number of teeth in the cam device 40, 41ª, should bear a definite relation to the number of teeth in the star wheel. For example, the star wheel is shown as having eight teeth, the cam member as having eight teeth and there being four of the roller detents 48. Normally each roller detent 48 seats in a recess 43 of the cam device, as shown in Fig. 5. When so seated the walls of the cam recesses bear against the roller detents and thus transmit motion of rotation to the cam device 40, 41ª and so to the sleeve 46. However, if the sleeve 46 is impeded in its rotary motion the roller detents 48 will roll up the inclined walls 45 of the cam recesses until they rest upon the flat upper surfaces of the teeth, as shown in Fig. 6.

The lower portion of the sleeve 46 is provided with a peripheral series of spur teeth 49 (Fig. 5) and when the roller detents 48 ride up onto the flat top surfaces of the teeth 42, the sleeve 46 is thereby raised sufficiently to cause the teeth 49 to intermesh with the teeth 37 of the non-rotatable abutment device 33. If, during such upward motion of the sleeve 46, the teeth 49 should contact the ends of the teeth 37 of the abutment device, the latter may rise, compressing the springs S, so as to avoid breakage of parts.

Near its upper end (Fig. 4) the shaft 27 has a portion 50 of reduced diameter which receives a collar 51 which rests upon the upper end of sleeve 46 and forms the lower abutment for a coiled compression spring 52 whose upper end is arranged within an inverted cup 53 having screw threaded engagement at 54 with the upper end of the shaft. The spring 52 thus normally urges the sleeve 46 downwardly and thus tends to keep the roller detents 48 within the recesses of the cam device 40, 41ª, as shown in Fig. 5. Since the star wheel does not function to drive the bottle along its path but is only an escapement device for releasing the bottle at the proper instant, the force exerted by the spring 52 need only be sufficient to insure the proper seating of the cam rolls 48 in the bottoms of the respective recesses 43. The sleeve 46 is provided with a vertical elongate keyway 55 (Fig. 5) which receives a key 56 (Fig. 4) by means of which it is connected to a sleeve member 57 on which is mounted a collar 58 (Fig. 4) which is secured in desired vertical adjustment relatively to the sleeve 57 by means of set screws 60. This collar 58 is provided with a horizontal flange 59 on which rests the central portion of the star wheel 5. A washer 61 is disposed above the central portion of the star wheel and the star wheel is clamped between this washer and the flange 59 by bolts 62. This arrangement of parts provides for rotative adjustment of the star wheel 5 relative to the main shaft 27 to obtain correct timing. Thus the star wheel is constrained to rotate with the sleeve 57 which in turn rotates with the inner sleeve 46 by means of key 56.

In the normal operation, and assuming that the articles are moving along the conveyor path in the intended manner, the star wheel is driven by engagement of the detent rollers 48 with the cam device 40, 41ª. However, if one of the moving articles takes the position of the article B¹ (Fig. 2) so that it is jammed and cannot advance, the normal rotation of the star wheel is prevented, and the roller detents 48 immediately ride up the inclined faces 45 onto the flat upper surfaces of the teeth 42, thereby lifting the sleeve 46 and the star wheel to a position such as indicated in broken lines in Fig. 4. At the same time the teeth 49 are meshed with the teeth 37 of the abutment device, thus preventing rotation of the star wheel. As the shaft 27 continues to rotate, the detent rolls 48 roll off of the flat surfaces of the teeth 42 and drop into the following recesses, under action of spring 52, so that the star wheel immediately drops back into the full line position of Fig. 4. This up and down motion of the star wheel continues, so long as the article is jammed, but during each up stroke the star wheel is locked against rotation by the inter-meshing of the teeth 37 and 49. The rapid up and down vibration of the star wheel is found to be sufficient under all ordinary circumstances to clear the article so that it will continue along the conveyor path and the jam is thus broken. If desired, the teeth 37 and 49 can be slightly inclined away from vertical, in such a manner as to impart a slight counter-rotation to the star wheel as it rises to broken line position and thereby free the article. However, since the resumption of normal rotation of the star wheel can only take place when one of the roller detents 48 is within one of the recesses 43 of the cam device, and since the number of roller detents and the number of recesses bears a definite relation to the number of teeth of the star wheel, the star wheel can only be restored to normal rotation when in properly timed relation to the mechanism to which the articles are being delivered. Thus the article which has been freed, when engaged by the driving tooth of the star wheel, will then advance toward the delivery point in exactly the proper time to reach the receiving mechanism in time with the latter, although its reception may have been delayed so that the receiving mechanism will have completed one or more idle cycles.

By this arrangement it is possible to use solid guide rails at the opposite sides of the conveyor without providing them with escape ports or gates through which jammed articles may be delivered from the guideway and thus the complications incident to the use of such escape devices are avoided. On the other hand the mechanism herein disclosed is very simple and compact and can be applied to the conventional conveyor without any substantial change in the latter. At the same time it is very effective, not only in automatically breaking a jam, but in accurately resuming the feeding operation in properly timed relation to the mechanism being fed.

While one desirable embodiment of the invention has been herein illustrated it is to be understood that the invention is broadly inclusive of any and all modifications within the scope of the appended claims.

I claim:

1. In combination, in article escapement mechanism for a conveyor which moves articles in succession along a predetermined path toward a star wheel which turns about a vertical axis adjacent to said path and wherein fixed guides cooperate with the star wheel to confine articles within the recesses between the star wheel teeth, and means for normally rotating the star wheel in timed relation to the conveyor comprising a sleeve coaxial with the shaft and having recesses and elevations in its end and a part which rides up onto said elevations when rotation of the star wheel is blocked thereby moving the star wheel in an axial direction.

2. In combination, in article escapement mechanism for a conveyor which moves articles in succession along a predetermined path toward a star wheel which normally turns in timed relation to the conveyor about an axis adjacent to said path and wherein a fixed part cooperates with the star wheel to confine articles within the recesses between the star wheel teeth, a shaft for driving the star wheel, and means for transmitting motion from the shaft to the star wheel comprising a sleeve coaxial with and fixed to the shaft, said sleeve having alternating recesses and elevations in its end, a detent element which rotates in time with the star wheel and which normally occupies one of the recesses in said sleeve whereby the detent normally revolves with the shaft, the elevations in the end of the sleeve being so shaped that if the rotation of the star wheel is blocked the detent rides up onto one of the elevations and thereby moves the star wheel axially.

3. In combination in article escapement mechanism for a conveyor which moves articles in succession along a predetermined path towards a star wheel which normally turns in timed relation to the conveyor about a vertical axis adjacent to said path and wherein a fixed guide cooperates with the star wheel to confine articles within the recesses between the star wheel teeth, a shaft for rotating the star wheel, and means for transmitting motion from the shaft to the star wheel comprising a sleeve fixed to the shaft and having alternating flat topped elevations and recesses in its end edge, a part which rotates with the star wheel, a plurality of detent elements, in number an aliquot part of the number of teeth of the star wheel, carried by said part, said detent elements normally seating in the recesses in the end of the sleeve and thereby being revolved by the shaft, and a spring tending to hold the detents in the recesses, the detents riding out of the recesses onto the flat tops of the teeth if the free rotation of the star wheel is blocked, thereby moving the star wheel axially of the shaft.

4. In combination in articles escapement mechanism for a conveyor which moves articles in succession along a predetermined path toward a star wheel which normally turns in timed relation to the conveyor about a vertical axis adjacent to said path and wherein a fixed guide cooperates with the star wheel to confine articles within the recesses between the star wheel teeth, means for rotating the star wheel, and means automatically operative, in response to jamming of an article between the star wheel tooth and said fixed guide, to free the star wheel from the means for rotating it, means for positively locking the star wheel against rotation, and means for imparting vibratory movement to the star wheel so long as the jamming continues.

5. In combination in article escapement mechanism for a conveyor which moves articles in succession along a predetermined path toward a star wheel which normally turns in timed relation to the conveyor about a vertical axis adjacent to said path and wherein a fixed guide cooperates with the star wheel to confine articles within the recesses between the star wheel teeth, a shaft for rotating the star wheel, a fixed annulus coaxial with the shaft having internal teeth, a part which rotates with the star wheel and which has a series of radial teeth, said latter teeth normally being in a plane axially spaced from the plane of said internal teeth, connections comprising disengageable parts normally operative to transmit motion from the shaft to the star wheel, said disengageable parts being so designed that if free rotation of the star wheel is blocked said parts are thereby disengaged automatically and said radial teeth are moved axially into engagement with the internal teeth thereby locking the star wheel against rotation.

6. In combination in article escapement mechanism for a conveyor which moves articles in succession along a predetermined path toward a star wheel which normally turns in timed relation to the conveyor about a vertical axis adjacent to said path and wherein a fixed guide cooperates with the star wheel to confine articles within the recesses between the star wheel teeth, a shaft for driving the star wheel, and means for transmitting motion from the shaft to the star wheel comprising a sleeve coaxial with the shaft and fixed to the latter, said sleeve having alternating recesses and flat topped teeth in its end edge, a part which rotates with the star wheel and which normally seats in one of said recesses in the sleeve whereby rotation of the shaft turns the star wheel, spring means tending to hold said part within the recess but permitting it to ride up onto the top of the tooth if the rotation of the star wheel is blocked, and means operative to lock the star wheel against rotation when said part rests on the tooth top.

7. In combination with a conveyor operative to feed articles to a machine by means of which said articles are processed, power driven escapement means normally moving in timed relation to said conveyor and processing machine and operative to deliver articles one by one in accurately timed relation for reception by the processing machine, and drive mechanism for the escapement means, said driving mechanism comprising a shaft and normally engaging, motion-transmitting parts which automatically disengage in response to abnormal resistance to rotation encountered by the escapement means, and means for locking the escapement means, the driving mechanism being so constructed and arranged that when said motion-transmitting parts are automatically disengaged the locking means becomes effective to prevent rotation of the star wheel in either direction.

8. In combination with a conveyor operative to feed articles to a machine by means of which said articles are processed, power driven escapement means normally moving in timed relation to said conveyor and processing machine and operative to deliver articles one by one in accurately timed relation for reception by the processing machine, and drive mechanism for the escapement means, said driving mechanism comprising normally engaging motion-transmitting parts which automatically disengage in response to abnormal resistance to rotation encountered by the escapement means, the escapement means comprising a star wheel and the drive means comprising pairs of motion-transmitting parts, in number an aliquot part of the number of teeth of the star wheel, whereby when said motion-transmitting parts are reengaged, after separation, the star wheel resumes operation in properly timed relation to the conveyor and processing machine.

9. In combination with a conveyor, a star wheel, a shaft, bearings for the shaft, means for rotating the shaft, a rotatable sleeve coaxial with the shaft, the sleeve being movable axially of the shaft, means for securing the star wheel to the sleeve and means for transmitting rotational motion from the shaft to the sleeve comprising an annular toothed member fixed to the shaft, said toothed member having a series of spaced teeth, the teeth equalling in number the teeth of the star wheel, detent elements carried by the sleeve, each detent element normally seating in a space between adjacent teeth of the annular toothed member, and spring means urging the sleeve in a direction to keep said detent elements within said spaces, the teeth of the annular toothed member being so shaped that if rotation of the star wheel is impeded, the detent elements will ride up out of the spaces between the teeth.

10. In combination with a conveyor operative to feed articles to a machine by means of which said articles are processed, power driven escapement means normally moving in timed relation to said processing machine and operative to deliver articles one by one in accurately timed relation for reception by the processing machine, and drive mechanism for the escapement means, said driving mechanism comprising normally engaging motion-transmitting parts which automatically disengage in response to abnormal resistance to rotation encountered by the escapement means, the escapement means comprising a star wheel and the drive means comprising an annulus fixed to the shaft and having spaced upstanding flat-topped teeth separated by recesses, and roller detents carried by the sleeve, each detent normally seating in a recess between adjacent teeth of said annulus, the engagement of the detents with the teeth transmitting motion from the shaft to the sleeve, the teeth being so shaped that if rotation of the star wheel is impeded, each detent will alternately ride up out of the recess onto the flat top of a tooth and then drop down into the next following recess, thereby imparting axial vibratory motion to the sleeve and star wheel.

11. In combination with a conveyor operative to feed articles to a machine by means of which said articles are processed, power driven escapement means normally moving in timed relation to said processing machine and operative to deliver articles one by one in accurately timed relation for reception by the processing machine, and drive mechanism for the escapement means, said driving mechanism comprising a shaft which constantly turns in the same direction, a sleeve which is movable axially of the shaft and normally turns with the shaft, an escapement element normally fixed relatively to the sleeve, a non-rotatable, axially movable annular part coaxial with the sleeve, having a radial, inwardly directed flange provided with spur teeth at its inner edge, spring means urging said toothed part axially into contact with a fixed stop, an annular part fixed to the sleeve and which has a series of spur teeth which engage the teeth carried by said fixed annular part when the sleeve is at one limit of its axial motion thereby positively preventing rotation of the sleeve in either direction, resilient means normally holding the sleeve at the other limit of its axial motion at which said sets of spur teeth are disengaged, an annular drive element fixed to the shaft, said drive element having thereon a series of spaced cam surfaces, a series of radial studs projecting from the sleeve each stud carrying a roller, the rollers being located in the spaces between adjacent cam surfaces when the sleeve is in its normal position whereby the cam surfaces, by engagement with the rollers, normally rotate the sleeve with the shaft, the cam surfaces being so shaped that, if the motion of the escapement element is obstructed, the cam elements, acting on said rolls, move the sleeve to the other limit of its axial motion thereby engaging the two sets of spur teeth and positively stopping rotation of the sleeve.

12. In combination in article escapement mechanism for a conveyor which moves articles in succession along a predetermined path toward a star wheel which turns about a vertical axis adjacent to said path and wherein a fixed guide cooperates with the star wheel to confine articles within the recesses between the star wheel teeth, means for rotating the star wheel comprising a drive shaft which constantly turns in the same direction and in timed relation to the conveyor, a sleeve which is movable axially of the shaft and which normally turns with the shaft, the star wheel being normally fixed to and coaxial with the sleeve, resilient means normally holding the sleeve at one limit of its axial motion, a toothed ratchet fixed to the shaft, each tooth of the ratchet having an inclined cam face, detent elements carried by the sleeve and normally engaged by the respective cam faces of the ratchet teeth, said detent elements and teeth being so shaped that while normally the teeth drive the detent elements and thereby turn the sleeve, the detent elements automatically ride up onto the flat tops of the teeth if free rotation of the star wheel is impeded while the sleeve moves axially from its normal position until the effective application of driving force to the sleeve is terminated, and positively acting locking elements which become effective automatically to hold the star wheel against rotation in either direction upon such axial movement of the sleeve.

13. In combination, in article escapement mechanism for a conveyor which moves articles in succession along a predetermined path toward a star wheel which turns about a vertical axis adjacent to said path and including means which cooperates with the star wheel to confine articles within the recesses between the star wheel teeth, means for driving the star wheel comprising a drive shaft which constantly turns in the same direction and in timed relation to the conveyor, a sleeve which is movable axially of the shaft and which normally turns with the shaft, the star wheel being normally fixed to and coaxial with the sleeve, resilient means normally holding the sleeve at one limit of its axial motion, a toothed ratchet fixed to the shaft, each tooth of the ratchet having an inclined cam face and a flat top, detent elements carried by the sleeve and which are normally engaged by the ratchet teeth, the engagement of said detent elements and teeth normally transmitting driving force from the shaft to the sleeve, said elements and teeth being so shaped that, if free rotation of the star wheel is impeded, the detent elements automatically ride up to the flat tops of the teeth while the sleeve moves axially from its normal position until application of driving force to the star wheel is terminated, a series of spur teeth coaxial with and turning with the sleeve, and a series of normally fixed spur teeth coaxial with the sleeve, the two series of teeth being in different horizontal planes when the sleeve is in its normal position but engaging and thereby locking the star wheel against rotation in either direction so long as the detent element remains on the flat tops of the ratchet teeth.

14. In combination, in article escapement mechanism for a conveyor which moves articles in succession along a predetermined path toward a star wheel which turns about a vertical axis adjacent to said path and including means which cooperates with the star wheel to confine articles within the recesses between the star wheel teeth, means for driving the star wheel comprising a drive shaft which constantly turns in the same direction and in timed relation to the conveyor, a sleeve which is movable axially of the shaft and which normally turns with the shaft, the star wheel being normally fixed to and coaxial with the sleeve, a toothed ratchet fixed to the shaft, each tooth of the ratchet having an inclined cam face, detent elements carried by the sleeve and which are normally engaged by the inclined cam surfaces of the ratchet teeth, the slopes of the cam surfaces being such that normally the shaft turns the sleeve but that if motion of the star wheel is obstructed, the sleeve is cammed axially to the other limit of its motion where the detent elements pass over the tops of the teeth thereby automatically discontinuing the rotation of the sleeve, and means operative to lock the star wheel against rotation in either direction when the sleeve is at the last-named limit of its axial motion.

15. In combination, in article escapement mechanism for a conveyor which moves articles in succession along a predetermined path toward a star wheel which turns about a vertical axis adjacent to said path and wherein a fixed guide cooperates with the star wheel to confine articles within the recesses between the star wheel teeth, means for driving the star wheel comprising a constantly driven shaft, a sleeve which is coaxial with and movable axially of the shaft and which normally rotates therewith, the star wheel being fixed to the sleeve, a toothed ratchet coaxial with and fixed to the shaft, the ratchet having circumferentially spaced teeth, each tooth having a flat top and having a face which is substantially parallel to the axis of the shaft and an opposite face which is inclined, radial studs projecting from the sleeve, a roller detent mounted to turn on each respective stud, a spring which urges the sleeve axially in a direction such as normally to seat the roller detents in the recesses between adjacent ratchet teeth, the spring pressure being so related to the slopes of said teeth that while normally, the detent rolls act to turn the sleeve with the shaft, the teeth act as cams to move the sleeve axially and thereby disengage the detent rolls from the ratchet teeth if the rotative motion of the star wheel is impeded, a non-rotatable abutment, and a part carried by the sleeve which automatically engages said abutment, thereby positively to prevent rotation of the sleeve in either direction when the sleeve has been moved axially in opposition to the spring by said cam action, the abutment being resiliently yieldable, axially of the shaft.

SIDNEY T. CARTER.

References Cited in the file of this patent

UNITED STATES PATENTS

| Number | Name | Date |
|---|---|---|
| 915,114 | Robin | Mar. 16, 1909 |
| 1,117,910 | Riley | Nov. 17, 1914 |
| 1,167,590 | Moss | Jan. 11, 1916 |
| 1,440,341 | Crispen | Dec. 26, 1922 |
| 1,604,440 | Wilkinson | Oct. 26, 1926 |
| 1,953,182 | Lyon | Apr. 3, 1934 |
| 2,025,108 | Hogg | Dec. 24, 1935 |